United States Patent [19]

Fan et al.

[11] Patent Number: 5,440,421
[45] Date of Patent: Aug. 8, 1995

[54] THREE-DIMENSIONAL PERIODIC DIELECTRIC STRUCTURES HAVING PHOTONIC BANDGAPS

[75] Inventors: Shanhui Fan, Cambridge; Pierre R. Villeneuve, Arlington, both of Mass.; Robert D. Meade, Morris Township, N.J.; John D. Joannopoulos, Belmont, Mass.

[73] Assignee: Massachusetts Institute of Technology, Cambridge, Mass.

[21] Appl. No.: 240,916

[22] Filed: May 10, 1994

[51] Int. Cl.⁶ .................................. H01L 33/00
[52] U.S. Cl. ...................... 359/344; 257/17; 437/15
[58] Field of Search ............ 359/344; 437/15, 235, 437/236, 915; 257/16, 17, 14, 21

[56] References Cited

U.S. PATENT DOCUMENTS

| | | |
|---|---|---|
| 4,015,893 | 4/1977 | Sugano et al. |
| 4,503,447 | 3/1985 | Iafrate et al. ............... 357/16 |
| 4,799,749 | 1/1989 | Börner et al. |
| 4,817,102 | 3/1989 | Maurer et al. |
| 4,983,540 | 1/1991 | Yamaguchi et al. ......... 437/110 |
| 4,999,682 | 3/1991 | Xu et al. ...................... 357/17 |
| 5,126,804 | 6/1992 | Nagai et al. ................. 357/17 |
| 5,155,567 | 10/1992 | Haga et al. |
| 5,166,826 | 11/1992 | Ruprecht. |
| 5,172,267 | 12/1992 | Yablonovitch. |
| 5,187,461 | 2/1993 | Brommer et al. |
| 5,210,801 | 5/1993 | Fournier et al. |
| 5,236,547 | 8/1993 | Takahashi et al. |
| 5,332,681 | 7/1994 | Tonucci et al. ............. 437/16 |

OTHER PUBLICATIONS

Ho, K. M., C. T. Chan, C. M. Soukoulis, R. Biswas and M. Sigalas, "Photonic Band Gaps in Three Dimensions: New Layer-By-Layer Periodic Structures", *Solid State Communications*, vol. 89, No. 5, 1994, pp. 413–416.

Özbay, E., E. Michel, G. Tuttle, R. Biswas, M. Sigalas and K. M. Ho, "Micromachined Millimeter-Wave Photonic Band-Gap Crystals", *Appl. Phys. Lett.*, vol. 64, No. 16, Apr. 18, 1994, pp. 2059–2061.

Sözüer, H. S. and Jonathan P. Dowling, "Photonic Band Calculations for Woodpile Structures", *Journal of Modern Optics*, vol. 41, No. 2, Feb. 1994, pp. 1≠16.

Sözüer, H. Sami and Joseph W. Haus, "Photonic Bands: Simple–Cubic Lattice", *J. Opt. Soc. Am. B*, vol. 10, No. 2, Feb. 1993, pp. 296–302.

Wendt, J. R., G. A. Vawter, P. L. Gourley, T. M. Brennan and B. E. Hammons, "Nanofabrication of Photonic Lattice Structures in GaAs/AlGaAs", *J. Vac. Sci. Technol. B*, vol. 11, No. 6, Nov./Dec. 1993, pp. 2637–2640.

Yablonovitch, E. and T. J. Gmitter, "Photonic Band Structure: The Face–Centered–Cubic Case Employing Nonspherical Atoms", *Physical Review Letters*, vol. 67, No. 17, Oct. 21, 1991, pp. 2295–2298.

*Primary Examiner*—Mark Hellner
*Attorney, Agent, or Firm*—Samuels, Gauthier & Stevens

[57] ABSTRACT

A periodic dielectric structure and method of fabricating same, the structure having a three-dimensional photonic bandgap. The structure includes a plurality of layers, each layer having a stratum of a first material having a first dielectric constant and a plurality of parallel grooves along a first axis lying in the plane of the layer, the grooves including a second material having a second dielectric constant; and a plurality of parallel channels formed through the plurality of layers in a second axis orthogonal to the plane of the layers, the channels being adapted to comprise a third material having a third dielectric constant, thereby resulting in the structure having three-dimensional periodicity. In preferred embodiments, the second and third materials include air.

20 Claims, 4 Drawing Sheets

THREE-DIMENSIONAL PERIODIC DIELECTRIC STRUCTURES HAVING PHOTONIC BANDGAPS

BACKGROUND OF THE INVENTION

Periodic dielectric structures, also known as photonic crystals, have the ability of affecting the density of electromagnetic states within their boundaries and even suppressing all modes for a range of frequencies. They can greatly affect the radiative dynamics within the structures and lead to significant changes in the properties of optical devices. This has opened a new and fascinating area for potential applications in optoelectronic devices and has prompted research to find structures that would generate large photonic bandgaps.

Several structures have been found to yield full 3D bandgaps. Examples of these structures are described in the following: Yablonovitch et al., "Photonic Band Structure: The Face-Centered-Cube Case Employing Nonspherical Atoms", Phys. Rev. Lett., Vol. 67, 2295 (1994); Sözüer et al., "Photonic Bands: Simple-Cubic Lattice", J. Opt. Soc. Am. B, Vol. 10, 296 (1993); Ho et al., "Photonic Band Gaps In Three Dimensions: New Layer-By-Layer Periodic Structures", Solid State Comm., Vol. 89, 413 (1994); Sözüer et al., "Photonic Band Calculations for Woodpile Structures", J. Mod. Opt., Vol. 41, 231 (1994); and Özbay et al., "Micromachined Millimeter-Wave Photonic Band-Gap Crystals", Appl. Phys. Lett., Vol. 64, 2059 (1994); all of which are incorporated herein by reference.

However, conventional fabrication at submicron lengthscales appears to be a difficult endeavor. The only apparent successful microfabrication of a photonic crystal has been reported by Wendt et al., "Nanofabrication of Photonic Lattice Structures in GaAs/AlGaAs", J. Vac. Sci. Tech. B, Vol. 11, 2637 (1993), incorporated herein by reference. The described structure consists of a triangular lattice of cylindrical holes. However, the structure is designed to give rise only to a 2D bandgap.

The primary difficulty with the microfabrication of a 3D photonic crystal comes from the rather sophisticated geometry and intricate arrangement of holes or rods required to open a gap. These complex structures do not easily lend themselves to fabrication at submicron lengthscales. Furthermore, most applications for photonic crystals require bandgaps larger than 10% which in turn requires the use of materials with large index contrasts.

SUMMARY OF THE INVENTION

The present invention provides a structure which solves all of the above problems in that it gives rise to large 3D gaps, its construction has an inherent simplicity, and it can be made with materials widely used in optoelectronic devices. In addition, experimental calculations show that the bandgaps are not very sensitive to the parameters of the structure. Therefore, deviations arising in the fabrication process should not significantly affect the results.

A primary objective of the present invention is to provide a relatively simple layered structure with a large index contrast that would require the etching of only one series of holes at normal incidence through the top surface of the layered structure. In addition, the etching process is done at the end of the growth procedure in order to simplify its fabrication.

Accordingly, the present invention provides a periodic dielectric structure and method of fabricating same, the structure having a three-dimensional photonic bandgap. The structure includes a plurality of layers, each layer having a stratum of a first material having a first dielectric constant and a plurality of parallel grooves along a first axis lying in the plane of the layer, the grooves including therein a second material having a second dielectric constant; and a plurality of parallel channels formed through the plurality of layers in a second axis orthogonal to the plane of the layers, the channels being adapted to comprise a third material having a third dielectric constant, thereby resulting in the structure having three-dimensional periodicity. In preferred embodiments, the second and third materials comprise air.

DETAILED DESCRIPTION OF THE ILLUSTRATED EMBODIMENTS

Figure 1:
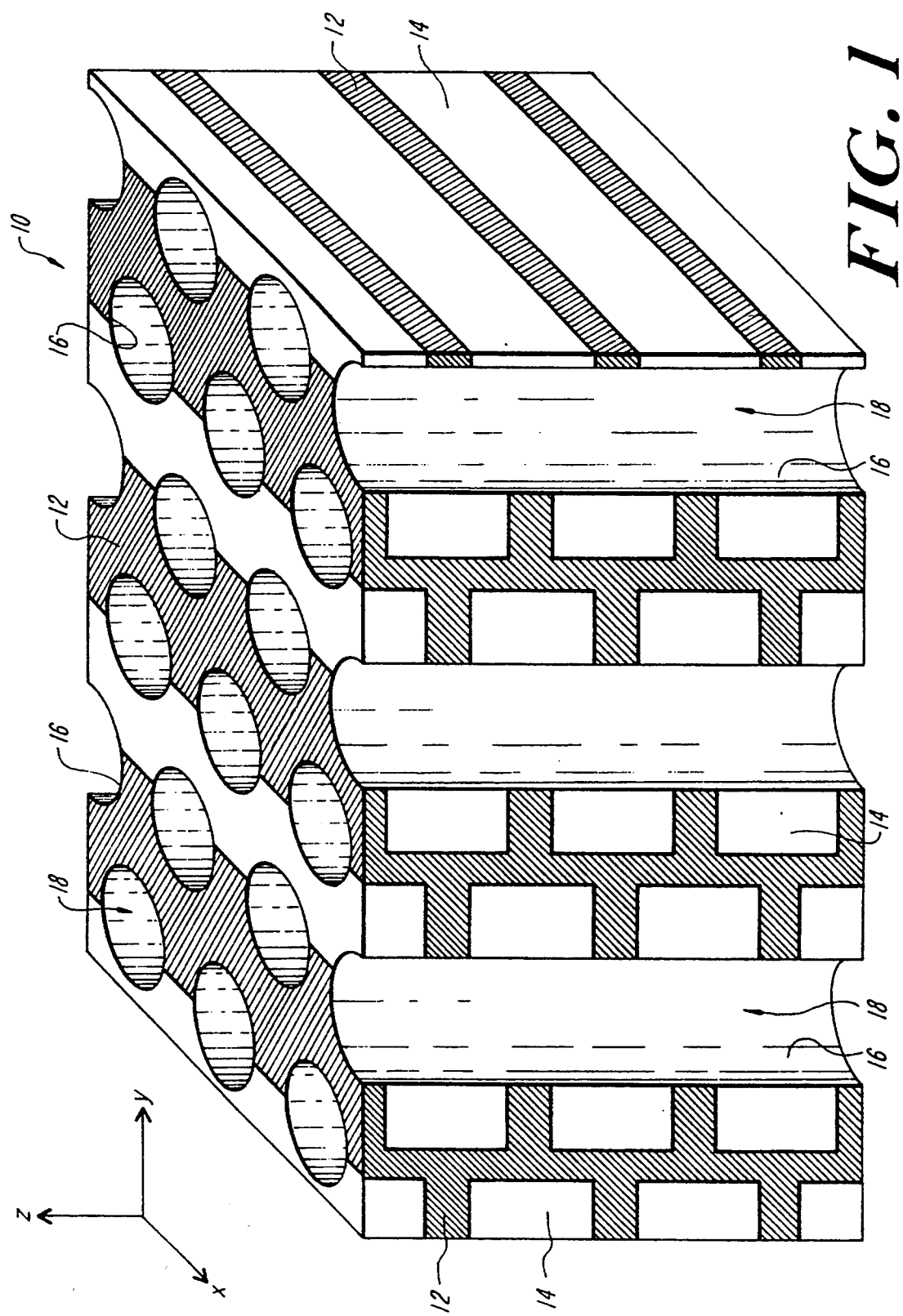
FIG. 1 shows a perspective view of the three-dimensional periodic dielectric structure in accordance with the present invention.

A three-dimensional periodic dielectric structure (photonic crystal) 10 is shown in FIG. 1. The structure 10 is essentially a layered structure made of a first material 12 having a first dielectric constant and interlayed parallel rows along the illustrated x-axis of a second material 14, preferably having a second dielectric constant different than the first dielectric constant. According to an exemplary embodiment, the first material is silicon and the second material is silicon dioxide. The structure 10 also includes a series of parallel channels 16 or columns fabricated through the structure in the illustrated z-axis for containing a third material 18 having a second dielectric constant which preferably has a large index contrast with the first dielectric constant. The use of the air columns (dielectric constant of 1) is preferred in order to provide the desired large index contrast between the different materials.

The structure 10 can be microfabricated by growing it layer by layer using conventional lithographic techniques. It is expected that ten layers should be sufficient, although some applications may require a smaller or larger number of layers. A generic fabrication process of the structure is described with reference to FIGS. 2A–2E. The illustrated sequence of growth steps is presented for illustrative purposes in order to enhance visualization of the basic elements that make up the structure 10, and does not have the pretension of describing the exact building process. In addition, for exemplary purposes, silicon, silicon dioxide and air will be used as the first, second and third materials, respectively.

Figure 2A:
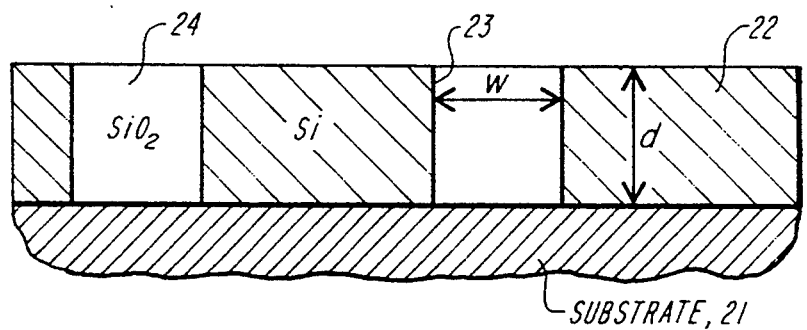
FIGS. 2A–2E show the step process of fabricating the three-dimensional periodic dielectric structure of the present invention.
Figure 2B:
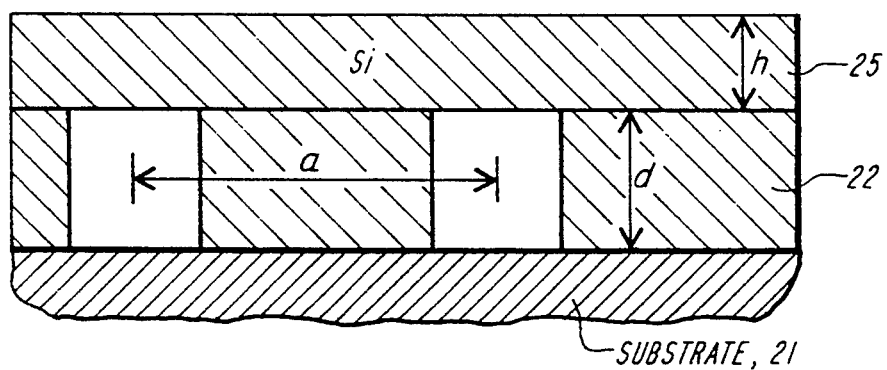
Figure 2C:
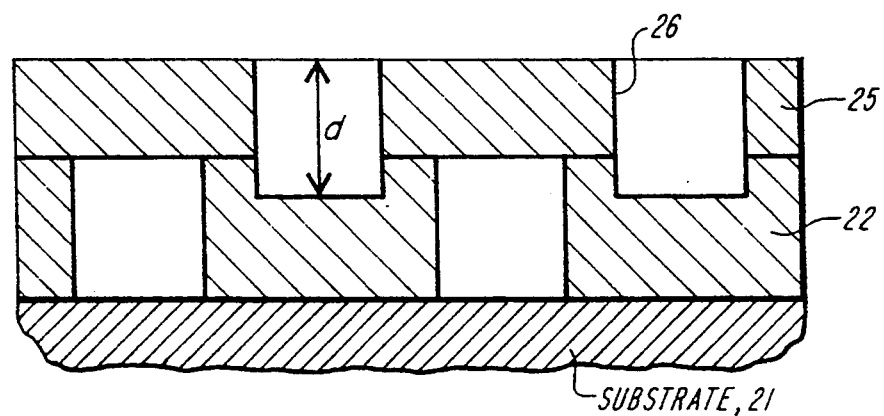

The process begins by depositing a layer 22 of silicon of thickness d on a substrate 21 of choice and by etching grooves 23 into the Si layer as shown in FIG. 2A. The grooves run parallel to the x-axis and are separated by a distance a; and have a depth d and a width w. The grooves 23 are then filled with the second material 24, SiO$_2$. The next step consists in growing another layer 25 of Si layer of height h on top of the previous layer, as shown in FIG. 2B, and etching additional grooves 26 of depth d and width w into this layer along the x-axis, as shown in FIG. 2C.

Figure 2D:
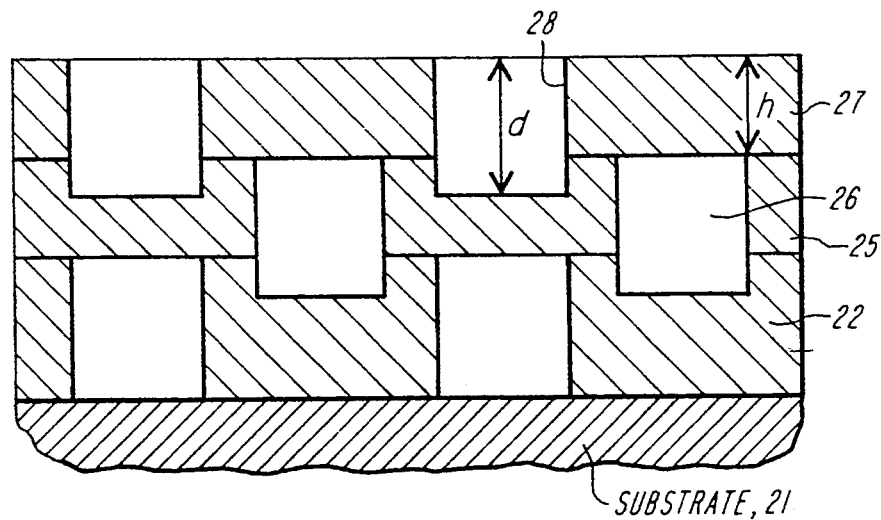

It will be appreciated that these grooves may extend into the first layer and are translated by a distance a/2 with respect to the grooves in the previous layer. After filling the grooves 26 with SiO$_2$, another Si layer 27 of height h is deposited on the top surface and long parallel grooves 28 are etched therein. The grooves are translated again by a distance a/2 with respect to the previous layer, as shown in FIG. 2D. From this point on, the structure repeats itself every two layers.

Figure 2E:
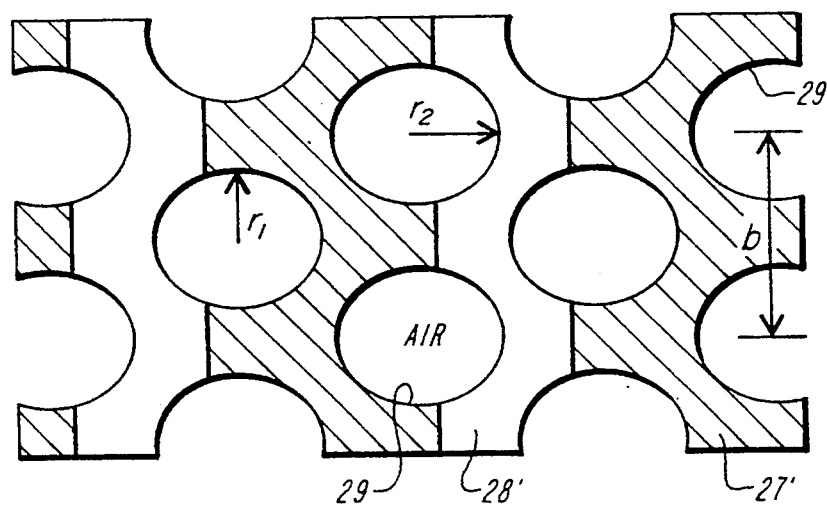

Once the layering process is completed to layer 27' and filled grooves 28', an array of parallel channels 29 or holes is etched into the top surface and through the structure, at normal incidence, along the z-axis. In general, the cross section of the holes can be of any shape. A preferred embodiment would involve either circular or elliptical holes with parameters r$_1$ and r$_2$, as shown in FIG. 2E. In the exemplary embodiment, the holes form a centered rectangular lattice on the top surface, and are separated by a distance b along the x-axis and the distance a along the y-axis. In the embodiment illustrated, the center of each hole 29 is aligned in the structure as shown in FIG. 2E, preferably with the shortest of such distances being a/4 from the center of any one filled groove.

Accordingly, the overall structure 10 is body centered orthorhombic with lattice constants b, a and 2h along the x-, y- and z-axes, respectively. In addition, the structure has a point group which includes three 180° rotation operators about the x-, y- and z-axes. In the special case where $a=b\sqrt{2}=2h\sqrt{2}$, the lattice becomes face centered cubic.

The design of the structure 10 has many degrees of freedom which can be used to optimize the size of the photonic bandgap, depending on the materials used in the fabrication. Although Si and SiO$_2$ were used in the above example, these materials can be replaced by other materials having a large index contrast. It is convenient to choose one of the lattice constants as the unit length scale; for example, initially the dimension a can be chosen, and thereafter every other parameter can be defined with respect to it. The size of the structure 10 can then be scaled to any wavelength simply by scaling a.

Figure 3A:
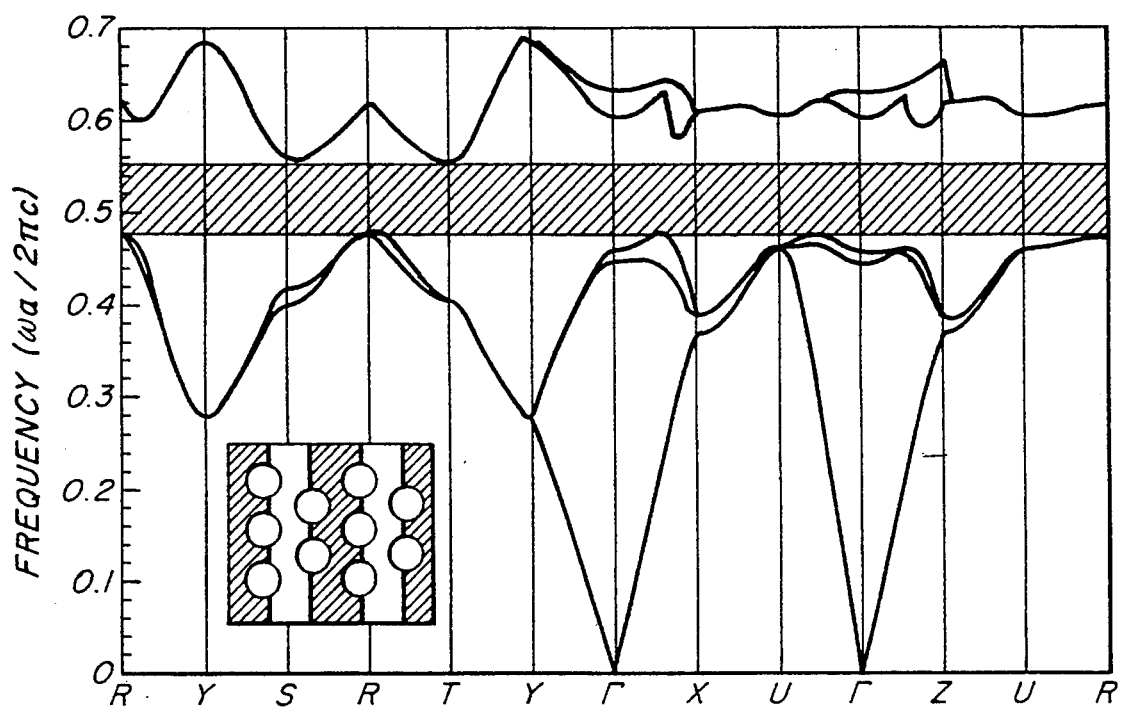
FIGS. 3A and 3B respectively show bandgap diagrams for alternate embodiments of the three-dimensional periodic dielectric structure of the present invention.

In the specific case where Si and SiO$_2$ are used in the fabrication process, the bandgap is found to be 13.9% of the midgap frequency when the width and depth of the SiO$_2$-filled grooves were 0.40a and 0.49a, respectively. Furthermore, the cross-section of the air columns was chosen to be circular with a radius of 0.21a. The other parameters used to optimize the gap were b=0.71a and h=0.35a. The band diagram is shown in FIG. 3A along various directions in the irreducible Brillouin zone. Without any loss in generality, a Brillouin zone is chosen, for simplicity, which is associated with a simple orthorhombic lattice. A dielectric constant of 12.096 for Si at $\lambda=1.53$ $\mu$m (10) and 2.084 for amorphous SiO$_2$ also at 1.53 $\mu$m (10) is used. This wavelength is approximately equal to the one used in many optical devices today. In the case where the gap is centered at 1.53 $\mu$m (f=196 THz), a is equal to 0.79 $\mu$m and the gap extends from $\lambda=1.43$ $\mu$m to $\lambda=1.64$ $\mu$m (f=182 THz to f=210 THz).

The bandgap is not very sensitive with respect to either the cross-sectional dimensions of the grooves or the air columns. By changing both the width and depth of the SiO$_2$-filled grooves, the gap remains larger than 13% for values of w between 0.35a and 0.40a and d between 0.45a and 0.51a. On the other hand, the cross-section of the air columns could be made elliptical with the major axis aligned either along the x- or y-axis without affecting the gap significantly. For example, the gap increases slightly to 14% if r$_1$=0.21a and r$_2$=0.23a.

Figure 3B:
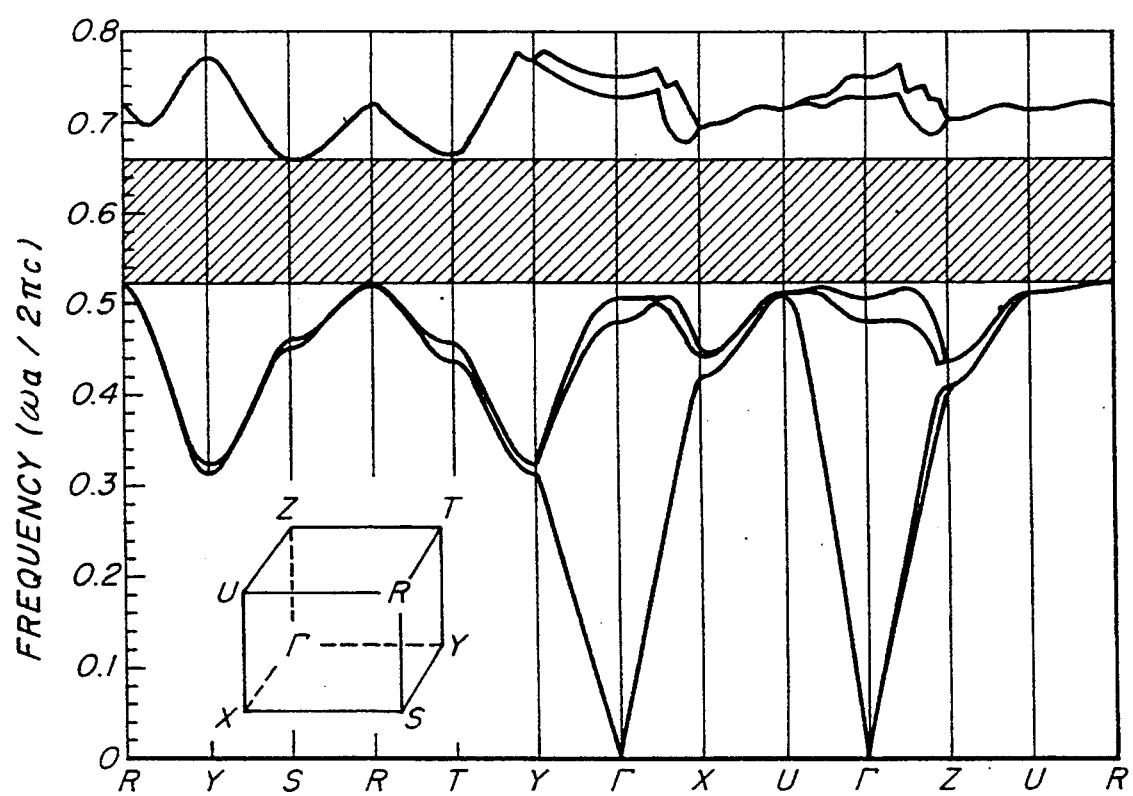

A very significant improvement could be made to the size of the bandgap simply by removing the second material 14 from the structure 10. For example, the removal of the silicon dioxide would increase the dielectric contrast between the silicon and the other materials in the structure, and would leave long holes with rectangular cross-section filled with air along the x-axis. The removal of the second material could be done, for example, with selective chemical etching. More specifically, if the oxide was removed from the structure presented in FIG. 3A, the gap would increase to 17%. The gap could be further increased by optimizing the parameters, for example a gap of 23% is found in the Si/air structure with w=0.36a, d=0.51a and r$_1$=r$_2$=0.24a. The corresponding bandgap diagram is shown in FIG. 3B. Again, the gap remains very large even if all four parameters are changed slightly. The gap remains larger than 20% for values of w between 0.35a and 0.38a, d between 0.47a and 0.51a, r$_1$ between 0.23a and 0.25a and r$_2$ between 0.21a and 0.25a.

Accordingly, a new class of photonic crystals designed specifically for fabrication at submicron wavelengths is provided with the present invention. These crystals give rise to three-dimensional bandgaps as large as 23%.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A method of fabricating a periodic dielectric structure having a three-dimensional photonic bandgap, said method comprising the steps of:
   (a) providing a substrate;
   (b) applying a layer of a first material having a first dielectric constant on said substrate;
   (c) forming a plurality of parallel grooves along a first axis lying in the plane of said layer;
   (d) filling said plurality of grooves with a second material having a second dielectric constant;
   (e) applying a further layer of said first material to overlie the previous layer of first material and filled grooves;
   (f) repeating steps (c)-(e) a predetermined number of times to form a multi-layered structure; and
   (g) forming a plurality of parallel channels through said multi-layered structure in a second axis orthogonal to the plane of the layers, said channels being adapted to comprise a third material having a third dielectric constant, thereby resulting in said structure having three-dimensional periodicity.

2. The method of claim 1, wherein step (g) further comprises the step of utilizing air as said third material.

3. The method of claim 1, wherein steps (b) and (e) further comprise the step of depositing silicon as said first material.

4. The method of claim 3, wherein step (d) further comprises the step of depositing silicon dioxide as said second material.

5. The method of claim 4, wherein said substrate comprises silicon.

6. The method of claim 1, wherein steps (b) and (e) further comprise the step of depositing gallium arsenide as said first material.

7. The method of claim 6, wherein step (d) further comprises the step of depositing aluminum gallium arsenide as said second material.

8. The method of claim 7, wherein said substrate comprises gallium arsenide.

9. The method of claim 1 further comprising the step of removing said second material from said structure.

10. The method of claim 1, wherein said further layers of said first material comprise a height h, and said grooves filled with said second material comprise a depth d and width w, wherein d is equal to or greater than h, such that said grooves extend into a previous layer of said first material.

11. The method of claim 10, wherein said grooves associated with any one layer of first material are separated by a distance a, and grooves associated with previous or subsequent layers of said first material are translated by a distance of a/2.

12. The method of claim 11, wherein said channels are separated along said first axis by a distance b, and are separated by said distance b along a third axis perpendicular to each of said first and second axes.

13. The method of claim 1, wherein said structure is fabricated at submicron lengthscales.

14. The method of claim 13, wherein said bandgap is fabricated to be in the range from 14% to 23% of the midgap frequency.

15. A periodic dielectric structure having a three-dimensional photonic bandgap, comprising:
a plurality of layers, each layer including a stratum of a first material having a first dielectric constant and a plurality of parallel grooves along a first axis in the plane of said layer, said grooves comprising a second material having a second dielectric constant; and
a plurality of parallel channels formed through said plurality of layers in a second axis orthogonal to the plane of the layers, said channels being adapted to comprise a third material having a third dielectric constant, thereby resulting in said structure having three-dimensional periodicity.

16. The structure of claim 15, wherein said third material comprises air.

17. The structure of claim 16, wherein said second material comprises air.

18. The structure of claim 16, wherein said first material comprises silicon and said second material comprises silicon dioxide.

19. The structure of claim 16, wherein said first material comprises gallium arsenide and said second material comprises aluminum gallium arsenide.

20. A method of fabricating a periodic dielectric structure having a three-dimensional photonic bandgap, said method comprising the steps of:
forming a plurality of layers, each layer including a stratum of a first material having a first dielectric constant and a plurality of parallel grooves along a first axis lying in the plane of said layer, said grooves comprising a second material having a second dielectric constant; and
forming a plurality of parallel channels through said plurality of layers in a second axis orthogonal to the plane of the layers, said channels being adapted to comprise a third material having a third dielectric constant, thereby resulting in said structure having three-dimensional periodicity.

* * * * *

UNITED STATES PATENT AND TRADEMARK OFFICE
CERTIFICATE OF CORRECTION

PATENT NO. : 5,440,421
DATED : August 8, 1995
INVENTOR(S) : Shanhui Fan, Pierre R. Villeneuve, Robert D. Meade and John D. Joannopoulos It is certified that error appears in the above-indentified patent and that said Letters Patent is hereby corrected as shown below:

Column 1, before line 7 insert the following paragraph -- This invention was made with government support under Contract Number DAAH04-93-G-0262 awarded by the United States Army, and Grant Number 9022933-DMR awarded by the National Science Foundation. The government has certain rights in the invention. --

Signed and Sealed this

Seventh Day of January, 1997

*Attest:*

BRUCE LEHMAN

*Attesting Officer*  Commissioner of Patents and Trademarks